(12) United States Patent
Danilov et al.

(10) Patent No.: US 11,449,248 B2
(45) Date of Patent: Sep. 20, 2022

(54) MAPPED REDUNDANT ARRAY OF INDEPENDENT DATA STORAGE REGIONS

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 431 days.

(21) Appl. No.: 16/584,800

(22) Filed: Sep. 26, 2019

(65) Prior Publication Data
US 2021/0096754 A1 Apr. 1, 2021

(51) Int. Cl.
*G06F 3/06* (2006.01)
*G06F 9/50* (2006.01)

(52) U.S. Cl.
CPC ............ *G06F 3/0631* (2013.01); *G06F 3/067* (2013.01); *G06F 3/0617* (2013.01); *G06F 3/0653* (2013.01); *G06F 3/0689* (2013.01); *G06F 9/5083* (2013.01); *G06F 2211/1078* (2013.01)

(58) Field of Classification Search
CPC .... G06F 3/0631; G06F 3/0617; G06F 3/0653; G06F 3/067; G06F 3/0689; G06F 3/061; G06F 9/5083; G06F 2211/1078
See application file for complete search history.

(56) References Cited

U.S. PATENT DOCUMENTS

| | | | |
|---|---|---|---|
| 5,675,802 A | 10/1997 | Allen et al. | |
| 5,805,788 A | 9/1998 | Johnson | |
| 5,950,225 A | 9/1999 | Kleiman | |
| 6,073,218 A | 6/2000 | Dekoning et al. | |
| 6,108,684 A | 8/2000 | Dekoning et al. | |
| 6,233,696 B1* | 5/2001 | Kedem ............... | G06F 11/0751 714/E11.034 |
| 6,240,527 B1 | 5/2001 | Schneider et al. | |
| 6,502,243 B1 | 12/2002 | Thomas | |
| 6,549,921 B1 | 4/2003 | Ofek | |
| 7,007,044 B1 | 2/2006 | Rafert et al. | |
| 7,103,884 B2 | 9/2006 | Fellin et al. | |
| 7,389,393 B1 | 6/2008 | Karr et al. | |
| 7,577,091 B2 | 8/2009 | Antal et al. | |

(Continued)

OTHER PUBLICATIONS

Notice of Allowance received for U.S. Appl. No. 16/570,657 dated Sep. 7, 2021, 65 pages.

(Continued)

*Primary Examiner* — Ramon A. Mercado

(74) *Attorney, Agent, or Firm* — Amin, Turocy & Watson, LLP

(57) ABSTRACT

A mapped redundant array of independent regions (mapped RAIR) for data storage is disclosed. A mapped RAIR can be allocated on top of one or more regions of a cluster storage construct or system. The cluster storage construct can be N nodes wide by M disks deep. A mapped RAIR cluster can comprise sites from real or mapped regions. A mapped region can comprise sites from two different real regions. Selection of sites comprised in a mapped region of a mapped RAIR can be based on geographic proximity, network proximity, a constraint, best practice, rule, etc., on customer preferences, etc. A mapped RAIR can provide data protection for data at a regional level.

20 Claims, 10 Drawing Sheets

(56) References Cited

U.S. PATENT DOCUMENTS

| | | |
|---|---|---|
| 7,631,051 B1 | 12/2009 | Fein et al. |
| 7,636,814 B1 | 12/2009 | Karr et al. |
| 7,664,839 B1 | 2/2010 | Karr et al. |
| 7,680,875 B1 | 3/2010 | Shopiro et al. |
| 7,694,191 B1 | 4/2010 | Bono et al. |
| 7,721,044 B1 | 5/2010 | Chatterjee et al. |
| 7,653,792 B2 | 6/2010 | Shimada et al. |
| 7,752,403 B1* | 7/2010 | Weinman, Jr. ...... G06F 21/6227 711/161 |
| 7,895,394 B2 | 2/2011 | Nakajima et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,429,514 B1 | 4/2013 | Goel |
| 8,479,037 B1 | 7/2013 | Chatterjee et al. |
| 8,495,465 B1 | 7/2013 | Anholt et al. |
| 8,504,518 B1 | 8/2013 | Ghemawat et al. |
| 8,540,625 B2 | 9/2013 | Miyoshi |
| 8,683,205 B2 | 3/2014 | Resch et al. |
| 8,725,986 B1 | 5/2014 | Goel |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,892,938 B1 | 11/2014 | Sundaram et al. |
| 8,972,478 B1 | 3/2015 | Storer et al. |
| 9,003,086 B1* | 4/2015 | Schuller ............. G06F 3/0614 710/62 |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,128,910 B1 | 9/2015 | Dayal et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,411,717 B2 | 8/2016 | Goss et al. |
| 9,442,802 B2 | 9/2016 | Hung |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 9,971,649 B2* | 5/2018 | Dhuse ................ H04L 43/0876 |
| 10,001,947 B1 | 6/2018 | Chatterjee et al. |
| 10,007,561 B1 | 6/2018 | Pudipeddi et al. |
| 10,055,145 B1* | 8/2018 | Danilov ............. G06F 11/1451 |
| 10,061,668 B1 | 8/2018 | Lazier et al. |
| 10,089,026 B1 | 10/2018 | Puhov et al. |
| 10,097,659 B1* | 10/2018 | Rao ................... G06F 11/1464 |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,628,043 B1 | 4/2020 | Chatterjee et al. |
| 10,644,408 B2 | 5/2020 | Sakai et al. |
| 10,671,431 B1 | 6/2020 | Dolan et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,754,845 B2 | 8/2020 | Danilov et al. |
| 10,761,931 B2 | 9/2020 | Goyal et al. |
| 10,797,863 B2 | 10/2020 | Chen et al. |
| 10,846,003 B2 | 11/2020 | Danilov et al. |
| 10,951,236 B2 | 3/2021 | Chen et al. |
| 11,023,331 B2 | 6/2021 | Danilov et al. |
| 2002/0049883 A1 | 4/2002 | Schneider et al. |
| 2002/0166026 A1 | 11/2002 | Ulrich et al. |
| 2002/0191311 A1 | 12/2002 | Ulrich et al. |
| 2003/0016596 A1 | 1/2003 | Chiquoine et al. |
| 2005/0027938 A1 | 2/2005 | Burkey |
| 2005/0071546 A1 | 3/2005 | Delaney et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0212744 A1* | 9/2006 | Benner ............... G06F 11/1076 714/6.12 |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0132543 A1* | 5/2009 | Chatley ............... H04L 67/1001 |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0040937 A1 | 2/2011 | Augenstein et al. |
| 2011/0066882 A1 | 3/2011 | Walls et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0191536 A1 | 8/2011 | Mizuno et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204079 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0013564 A1 | 1/2013 | Ben-Or et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |

(56) References Cited

U.S. PATENT DOCUMENTS

| | | |
|---|---|---|
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0122745 A1 | 5/2014 | Singh et al. |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0172930 A1 | 6/2014 | Molaro et al. |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0304460 A1 | 10/2014 | Carlson, Jr. et al. |
| 2014/0331100 A1 | 11/2014 | Dhuse et al. |
| 2014/0351633 A1* | 11/2014 | Grube .................... G06F 3/067 714/6.24 |
| 2014/0358972 A1 | 12/2014 | Guarrier et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1 | 7/2015 | Kesselman et al. |
| 2015/0254150 A1* | 9/2015 | Gordon ............... G06F 11/1402 714/6.3 |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0239384 A1 | 8/2016 | Slik |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1* | 11/2016 | Baptist .................... G06F 3/065 |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0010944 A1 | 1/2017 | Saito et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0115903 A1 | 4/2017 | Franke et al. |
| 2017/0116088 A1 | 4/2017 | Anami et al. |
| 2017/0123914 A1 | 5/2017 | Li et al. |
| 2017/0153946 A1* | 6/2017 | Baptist .................... G06F 3/0644 |
| 2017/0185331 A1 | 6/2017 | Gao et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0220662 A1* | 8/2017 | Barton .................... G06F 16/275 |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0272209 A1* | 9/2017 | Yanovsky ............. H03M 13/13 |
| 2017/0285952 A1 | 10/2017 | Danilov et al. |
| 2017/0286009 A1 | 10/2017 | Danilov et al. |
| 2017/0286436 A1* | 10/2017 | Neporada ........... H03M 13/353 |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074753 A1* | 3/2018 | Ober ..................... G06F 3/0605 |
| 2018/0074881 A1 | 3/2018 | Burden |
| 2018/0088857 A1 | 3/2018 | Gao et al. |
| 2018/0107415 A1* | 4/2018 | Motwani ............... G06F 3/0644 |
| 2018/0121286 A1 | 5/2018 | Sipos |
| 2018/0129417 A1 | 5/2018 | Sivasubramanian et al. |
| 2018/0129600 A1 | 5/2018 | Ishiyama et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0217888 A1 | 8/2018 | Colgrove et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0293017 A1* | 10/2018 | Curley .................. G06F 3/0604 |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0102103 A1 | 4/2019 | Ari et al. |
| 2019/0114223 A1 | 4/2019 | Pydipaty et al. |
| 2019/0129644 A1 | 5/2019 | Gao et al. |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0342418 A1* | 11/2019 | Eda ....................... H04L 67/101 |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0004447 A1 | 1/2020 | Danilov et al. |
| 2020/0026810 A1 | 1/2020 | Subramaniam et al. |
| 2020/0034339 A1 | 1/2020 | Gershaneck et al. |
| 2020/0034471 A1 | 1/2020 | Danilov et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117547 A1 | 4/2020 | Danilov et al. |
| 2020/0117556 A1 | 4/2020 | Zou et al. |
| 2020/0145511 A1* | 5/2020 | Gray ....................... H04L 41/12 |
| 2020/0151353 A1* | 5/2020 | Struttmann ......... G06F 16/9014 |
| 2020/0204198 A1* | 6/2020 | Danilov ............... G06F 11/1435 |
| 2021/0019067 A1 | 1/2021 | Miller et al. |
| 2021/0019093 A1 | 1/2021 | Karr et al. |
| 2021/0019237 A1 | 1/2021 | Karr et al. |
| 2021/0034268 A1 | 2/2021 | Hara et al. |
| 2021/0096754 A1* | 4/2021 | Danilov .................. G06F 3/061 |
| 2021/0132851 A1* | 5/2021 | Danilov .................. G06F 3/065 |
| 2021/0133049 A1 | 5/2021 | Danilov et al. |
| 2021/0218420 A1* | 7/2021 | Danilov ............. G06F 9/30029 |

(56) References Cited

U.S. PATENT DOCUMENTS

| | | |
|---|---|---|
| 2021/0255791 A1 | 8/2021 | Shimada et al. |
| 2021/0273660 A1 | 9/2021 | Danilov et al. |

OTHER PUBLICATIONS

Ma et al., "An Ensemble of Replication and Erasure Codes for Cloud File Systems", Proceedings—IEEE Infocom, Apr. 2013, pp. 1276-1284.

Final Office Action received for U.S. Appl. No. 16/698,096 dated Sep. 7, 2021, 24 pages.

Final Office Action received for U.S. Appl. No. 16/177,285 dated Sep. 14, 2021, 65 pages.

Final Office Action received for U.S. Appl. No. 16/670,715 dated Sep. 7, 2021, 35 pages.

Final Office Action received for U.S. Appl. No. 16/179,486 dated Oct. 20, 2021, 46 pages.

Notice of Allowance received for U.S. Appl. No. 16/745,855 dated Sep. 10, 2021, 37 pages.

Non-Final Office Action received for U.S. Appl. No. 16/526,182 dated Nov. 24, 2021, 83 pages.

Notice of Allowance received for U.S. Appl. No. 16/888,144 dated Nov. 22, 2021, 71 pages.

Non-Final Office Action received for U.S. Appl. No. 16/209,185 dated Jun. 18, 2020, 22 pages.

Martin Hosken, Developing a Hyper-Converged Storage Strategy for VMware vCloud Director with VMware vSAN, Jan. 2018 (Year 2018).

Non-Final Office Action received for U.S. Appl. No. 16/261,549 dated Apr. 15, 2020, 22 pages.

Non-Final Office Action received for U.S. Appl. No. 16/374,726 dated Jun. 2, 2020, 47 pages.

Matarajan, Raid 0, Raid 1, Raid 5, Raid 10 Explained with Diagrams, Aug. 10, 2010, thegeekstuff.com (18 pages).

Non-Final Office Action received for U.S. Appl. No. 16/399,897 dated Feb. 19, 2021, 56 pages.

Non-Final Office Action received for U.S. Appl. No. 16/670,715 dated Mar. 31, 2021, 60 pages.

Final Office Action received for U.S. Appl. No. 16/177,278 dated Feb. 24, 2021, 109 pages.

EMC; "EMC ECS (Elastic Cloud Storage) Architectural Guide v2.x;" EMC; Jun. 2015; available at: https://www.dell.com/community/s/vjauj58549/attachments/vjauj58549/solutions-ch/477 /1/h14071-ecs-architectural-guide-wp.pdf, Jun. 2015, 21 pages.

Mohan et al., "Geo-aware erasure coding for high-performance erasure-coded storage clusters", Springer Link, URL: https://link.springer.com/article/10.1007/s 12243-017-0623-2, Jan. 18, 2018.

Final Office Action received for U.S. Appl. No. 16/179,486 dated Jan. 28, 2021, 55 pages.

Non-Final Office Action received for U.S. Appl. No. 16/670,746 dated Feb. 16, 2021, 55 pages.

Dell Technologies, "ECS Overview and Architecture", h14071.18, Feb. 2021, 55 Pages.

Non-Final Office Action received for U.S. Appl. No. 16/177,285 dated Apr. 9, 2021, 41 pages.

Non-Final Office Action received for U.S. Appl. No. 16/779,208 dated Apr. 20, 2021, 71 pages.

Non-Final Office Action received for U.S. Appl. No. 16/526,142 dated Oct. 15, 2020, 21 pages.

Notice of Allowance received U.S. Appl. No. 16/228,612 date Oct. 20, 2020, 84 pages.

Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.

Non-Final Office Action received for U.S. Appl. No. 16/010,255 dated Oct. 29, 2020, 65 pages.

Final Office Action received for U.S. Appl. No. 16/240,272 dated Oct. 27, 2020, 42 pages.

Non-Final Office Action received for U.S. Appl. No. 16/399,902 dated Oct. 28, 2020, 83 pages.

Notice of Allowance received for U.S. Appl. No. 16/374,726 dated Nov. 20, 2020, 78 pages.

Final Office Action received for U.S. Appl. No. 16/228,624 dated Dec. 1, 2020, 63 pages.

Non-Final Office Action received for U.S. Appl. No. 16/570,657 dated Nov. 27, 2020, 75 pages.

Final Office Action received for U.S. Appl. No. 16/177,285 dated Dec. 30, 2020, 61 pages.

Final Office Action received for U.S. Appl. No. 16/511,161 dated Dec. 30, 2020, 61 pages.

Non-Final Office Action received for U.S. Appl. No. 16/399,895 dated Jan. 4, 2021, 64 pages.

Notice of Allowance received for U.S. Appl. No. 16/374,726 dated Jan. 6, 2021, 56 pages.

Notice of Allowance received for U.S. Appl. No. 16/726,428 dated Jun. 14, 2021, 34 pages.

Non-Final Office Action received for U.S. Appl. No. 16/698,096 dated May 24, 2021, 62 pages.

Non-Final Office Action received for U.S. Appl. No. 16/745,855 dated May 13, 2021, 71 pages.

Non-Final Office Action received for U.S. Appl. No. 16/834,649 dated Jun. 24, 2021, 61 pages.

Non-Final Office Action received for U.S. Appl. No. 16/179,486 dated May 12, 2021, 50 pages.

Non-Final Office Action received for U.S. Appl. No. 16/570,657 dated May 12, 2021, 79 pages.

Non-Final Office Action received for U.S. Appl. No. 16/670,765 dated Jul. 20, 2021, 79 pages.

Thomasian et al., "Hierarchical RAID: Design, performance, reliability, and recovery", J. Parallel Distrib. Comput. vol. 72 (2012) pp. 1753-1769.

Non-Final Office Action received for U.S. Appl. No. 16/177,285 dated Jul. 22, 2020, 31 pages.

Non-Final Office Action received for U.S. Appl. No. 16/261,547 dated Sep. 3, 2020, 26 pages.

Non-Final Office Action received for U.S. Appl. No. 16/261,548 dated Aug. 21, 2020, 42 pages.

Notice of Allowance received for U.S. Appl. No. 16/261,549 dated Jul. 17, 2020, 40 pages.

Qiang et al., "Dynamics Process of Long-running Allocation/Collection in Linear Storage Space", International Conference on Networking, Architecture, and Storage (NAS 2007), Guilin, 2007, pp. 209-216.

Non-Final Office Action received for U.S. Appl. No. 16/374,725 dated Aug. 19, 2020, 50 pages.

Non-Final Office Action received for U.S. Appl. No. 16/511,161 dated Jul. 10, 2020, 24 pages.

Notice of Allowance received for U.S. Appl. No. 15/862,547 dated Mar. 29, 2019 27 pages.

Non-Final Office Action received for U.S. Appl. No. 15/792,714 dated Apr. 4, 2019, 20 pages.

Final Office Action received for U.S. Appl. No. 15/792,714 dated Sep. 12, 2019, 43 pages.

Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.

Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.

Wikipedia "Front and back ends" URL: https://en.wikipedia.org/wiki/Front_and_back_ends (Year:2019), Sep. 6, 2019, 4 pages.

Notice of Allowance received for U.S. Appl. No. 15/792,714 dated Nov. 8, 2019, 31 pages.

Non-Final Office Action received for U.S. Appl. No. 15/791,390 dated Sep. 20, 2019, 27 pages.

Final Office Action received for U.S. Appl. No. 15/791,390 dated Feb. 6, 2020, 29 pages.

Non-Final Office Action received for U.S. Appl. No. 15/791,390 dated Apr. 30, 2020, 48 pages.

(56) References Cited

OTHER PUBLICATIONS

Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—Raid 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non- Final Office Action received for U.S. Appl. No. 16/177, 278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed Raid—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Office Action dated Apr. 13, 2021 for U.S. Appl. No. 16/781,316, 21 pages.
Non-Final Office Action received for U.S. Appl. No. 16/670,715 dated Jan. 5, 2022, 22 pages.
Non-Final Office Action received for U.S. Appl. No. 16/834,649 dated Jan. 28, 2022, 26 pages.
Office Action dated Feb. 8, 2022 for U.S. Appl. No. 16/986,222, 62 pages.
Office Action dated Nov. 24, 2021 for U.S. Appl. No. 16/538,984, 30 pages.
Non-Final Office Action received for U.S. Appl. No. 16/698,096 dated Jan. 5, 2022, 21 pages.
Notice of Allowance dated May 16, 2022 for U.S. Appl. No. 16/526,182, 54 pages.
Non-Final Office Action received for U.S. Appl. No. 16/403,417 dated Feb. 25, 2022, 100 pages.
Non-Final Office Action received for U.S. Appl. No. 17/153,602 dated Mar. 16, 2022, 40 pages.
Notice of Allowance received for U.S. Appl. No. 17/333,793 dated Mar. 9, 2022, 39 pages.
Sun et al., "Data Management across Geographically-Distributed Autonomous Systems: Architecture, Implementation, and Performance Evaluation," IEEE Transactions on Industrial Informatics, 2019, 9 pages.
Notice of Allowance dated Jun. 8, 2022 for U.S. Appl. No. 16/179,486, 67 pages.
Office Action dated Jun. 17, 2022 for U.S. Appl. No. 16/986,222, 76 pages.
Office Action dated Jul. 14, 2022 for U.S. Appl. No. 17/153,602, 34 pages.
Office Action dated Jun. 1, 2022 for U.S. Appl. No. 16/538,984, 114 pages.
Notice of Allowance dated Jun. 27, 2022 for U.S. Appl. No. 17/333,815, 10 pages.

\* cited by examiner

US 11,449,248 B2

MAPPED REDUNDANT ARRAY OF INDEPENDENT DATA STORAGE REGIONS

TECHNICAL FIELD

The disclosed subject matter relates to data storage, more particularly, to mapping storage pools comprising storage devices of at least one array of storage devices.

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As an example, a storage group of five nodes, with ten disks per node, at 8 terabytes (TBs) per disk is roughly 400 TB in size. This can be excessively large for some types of data storage, however apportioning smaller groups, e.g., fewer nodes, less disks, smaller disks, etc., can be inefficient in regards to processor and network resources, e.g., computer resource usage, to support these smaller groups. As such, it can be desirable to have more granular logical storage groups that can employ portions of larger real groups, thereby facilitating efficient computer resource usage, e.g., via larger real groups, but still providing smaller logical groups that can be used more optimally for storing smaller amounts of data therein.

DETAILED DESCRIPTION

Figure 1:
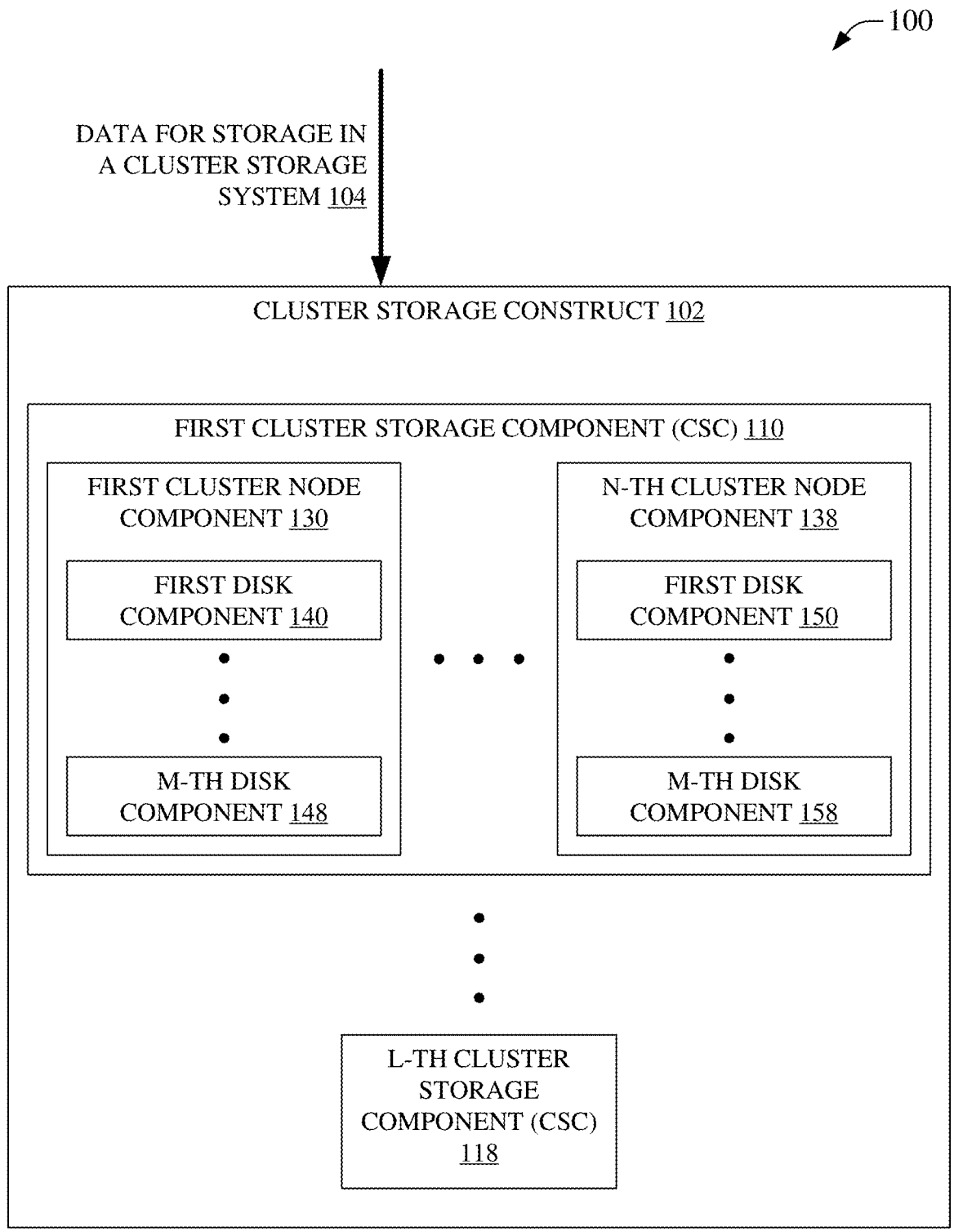
FIG. 1 is an illustration of an example system that can facilitate storage of data in a mapped redundant array of independent data storage regions, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices. As an example, data can be stored in an ECS system such as is provided by DELL EMC. The example ECS system can comprise data storage devices, e.g., disks, etc., arranged in nodes, wherein nodes can be comprised in an ECS cluster. Other examples of data storage can store data in storage devices that are not arranged in nodes, clusters, etc. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via larger real groups, but still providing smaller logical groups that can be used more efficiently for storing smaller amounts of data therein.

In an embodiment of the presently disclosed subject matter, a mapped redundant array of independent nodes, hereinafter a mapped RAIN, can comprise a mapped cluster, wherein the mapped cluster comprises a logical arrangement of real storage devices. In a mapped cluster, a real cluster(s), e.g., a group of real storage devices comprised in one or more hardware nodes, comprised in one or more clusters, can be defined so allow more granular use of the real cluster in contrast to conventional storage techniques. In an aspect, a mapped cluster can comprise nodes that provide data redundancy, which, in an aspect, can allow for failure of a portion of one or more nodes of the mapped cluster without loss of access to stored data, can allow for removal/addition of one or more nodes from/to the mapped cluster without loss of access to stored data, etc. As an example, a mapped cluster can comprise nodes having a data redundancy scheme analogous to a redundant array of independent disks (RAID) type-6, e.g., RAID6, also known as double-parity RAID, etc., wherein employing a node topology and two parity stripes on each node can allow for two node failures before any data of the mapped cluster becomes inaccessible, etc. In other example embodiments, a mapped cluster can employ other node topologies and parity techniques to provide data redundancy, e.g., analogous to RAID0, RAID1, RAID2, RAID3, RAID4, RAID5, RAID6, RAID0+1, RAID1+0, etc., wherein a node of a mapped cluster can comprise one or more disks, and the node can be loosely similar to a disk in a RAID system. Unlike RAID technology, an example mapped RAIN system can provide access to more granular storage in generally very large data storage systems, often on the order of terabytes, petabytes, exabytes, zettabytes, etc., or even larger, because each node can generally comprise a plurality of disks, unlike RAID technologies.

In an embodiment, a mapped redundant array of independent data storage regions (RAIR) can be a virtualization of storage devices comprised in storage sites, hereinafter typically referred to as 'sites', that generally would not be regarded as being in the same region. In an aspect, a region can be defined as a group of storage sites that satisfy a selection rule, wherein satisfying the selection rule is typically related to a grouping criterion such as geography, distance, connectivity, cost of data access, etc. As an example, a Miami region can comprise storage sites, e.g. storage devices at a storage site location, that are inside the city limits, that have above a threshold level of network connectivity to a first storage site, etc. In this example, the Miami region can exclude storage sites in Boca Raton, etc. In this example, the Miami region can include storage sites, for example, in Fort Lauderdale that have a threshold level of network connectivity to a designated first storage site, e.g., the Fort Lauderdale storage site can be 'proximate' to the first storage site from a network connectivity perspective, etc. Regions can be defined, for example, to meet data storage customer demands, to dictate data storage topology, to affect the cost of data storage, to improve data access times or reduce data access costs, etc. As an example, a customer can seek to mirror data between two data storage sites in a same region so that if data access on one site becomes impaired, the mirrored data in the same region at the other storage site can be expected to be readily accessible. This can be in contrast to accessing mirrored data that can be at a far distant location and which can suffer from increased access time, cost, reliability, etc. As an example, a first site in Miami and a second site in Fort Lauderdale can be designated as being in the same region where they satisfy a selection rule, such that the example customer can access the mirrored data in Fort Lauderdale if the data access to the Miami site becomes impaired. This can be faster, cheaper, more reliable, etc., that accessing mirrored data, for example, stored in Anchorage, Ak. In an aspect, a region can be termed a 'real region' that can be distinguished from a 'mapped region' that can comprise sites from more than one real region. As an example, real regions can comprise a Florida region and a Texas region that each can comprise sites in the corresponding states, while a mapped region can comprise one or more Florida site and one or more Texas site, wherein the sites from the real regions can be selected for inclusion in the mapped region based on criteria, rules, demands, site characteristics, best practices etc.

In some embodiments, allocation of data storage in sites of a region can exceed available capacity in the region. Accordingly, sites from other regions can be selected to share data storage. This can be regarded as a 'mapped' data storage region because it can comprise sites in two or more 'real' regions. As an example, if Miami is a first 'real' region and Tampa is a second 'real' region, a mapped region can comprise a site in the Miami region and a site in the Tampa region, e.g., the sites from the two regions are mapped into a mapped region. Selection of sites comprising a mapped region can be based on similar, although perhaps more relaxed selection criteria, rules, etc., as employed in designating real regions. As an example, where a customer requests storage that exceeds that available in a Fort Lauderdale region, a mapped region can be determined. Where this example mapped region can be comprised of either a site in Miami or a site in Missoula, the selection can be based on a network 'proximity', a geographic proximity, etc. Where the Miami site can be located much closer than the Missoula site, data will likely traverse a faster network path, e.g., satisfying a selection rule, and the Miami site and the Fort Lauderdale site, accordingly, can be designated as a mapped region to meet the customer demand.

In mapped RAIR, redundancy can still be protected via geographic diversity. In an aspect, a mapped region can provide for primary data storage. In an aspect a mapped region can provide for data protection storage. In some embodiments, a first mapped region can provide primary data storage and a second mapped region can provide data protection storage. Returning to an earlier example, a customer can store data and a mirror in a first region and can back-up or protect data at a second geographically diverse region, wherein the first region or the second region can 'real' or 'mapped' regions. In an aspect, each storage device of each cluster, of each site, of each region or mapped region, can communicate with each other storage device of each other cluster of each other site of each other region or mapped region, via a communication framework, for example as is disclosed herein below at FIG. 9, etc. In some embodiments, a cluster storage construct can enable one or more data storage system instances that can each store data according to a geographically diverse scheme via a real cluster, a mapped cluster, a real region, a mapped region, etc., or combinations thereof. Multiple instances of data storage systems can be simultaneously supported by the disclosed subject matter.

While the disclosed subject matter generally refers to storage of data in nodes, clusters, etc., it is noted that data can be stored in other data storage systems that can similarly employ mapped RAIR technology. As an example, non-cluster storage devices can be comprised in a site of a first mapped region that is comprised in a mapped RAIR. In this example, the site can comprise a rack of storage devices that act as a single storage device and the storage devices comprised in the rank can be unavailable for selection into any cluster of storage devices. This can contrast to cluster-type storage systems that can select storage devices to be assigned to a cluster. As such, the disclosed mapped RAIR technology can be employed in nearly any type of data storage system and all such data storage systems are to be considered within the scope of the present disclosure even where not explicitly recited for the sake of clarity and brevity. Also for clarity and brevity, the present disclosure will generally continue refer to cluster-type data storage systems in regard to mapped RAIR technology to provide continuity of understanding.

In an embodiment, software, firmware, etc., can hide the abstraction of mapping nodes in a mapped RAIN system, e.g., the group of nodes can appear to be a contiguous block of data storage even where, for example, it can be spread across multiple portions of one or more real disks, multiple real groups of hardware nodes (a real RAIN), multiple real clusters of hardware nodes (multiple real RAINs), multiple geographic locations, different real and/or mapped regions, etc. For a given real cluster, e.g., real RAIN, that is N nodes wide and M disks deep, a mapped RAIN can consist of up to N' mapped nodes and manage up to M' portions of disks of the constituent real nodes. These mapped nodes/disks can be comprised in sites arranged by regions. Accordingly, in an embodiment, one mapped node is expected to manage disks of different real nodes. Similarly, in an embodiment, disks of one real node are expected to be managed by mapped nodes of different mapped RAIN clusters. The real nodes or mapped nodes can be comprised in either a real or a mapped region. In some embodiments, the use of two disks by one real node can be forbidden to harden mapped RAIN clusters against a failure of one real node compromising two or more mapped nodes of one mapped RAIN cluster, e.g., a data loss event, etc. Similarly, in some embodiments, the use of two sites of one real region by different mapped regions of one mapped RAIR can be forbidden to harden the mapped RAIR against a failure of one real region compromising the two or more mapped regions of the one mapped RAIR, e.g., a data loss event, etc. Hereinafter, a portion of a real disk can be comprised in a real node that can be comprised in a real cluster that can be comprised in a real site that can be comprised in a real region or a mapped region and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc., and, for convenience, the term RAIN can be omitted for brevity, e.g., a mapped RAIN cluster can be referred to simply as a mapped cluster, a mapped RAIN node can simply be referred to as a mapped node, etc., wherein 'mapped' is intended to convey a distinction from a corresponding real physical hardware component. Similarly, the term RAIR can be omitted for brevity, e.g., a mapped RAIR region can be referred to simply as a mapped region, a mapped RAIR site can simply be referred to as a site, etc., wherein 'mapped' is again intended to convey a distinction between a region spanning sites in a same physical proximity, network proximity, etc., e.g., a real region, and a region spanning sites in across different real regions.

In an embodiment, a mapped cluster can be comprised in a real cluster, e.g., the mapped cluster can be N' by M' in size and the real cluster can be N by M in size, where N'=N and where M'=M. In other embodiments, N' can be less than, or equal to, N, and M' can be less than, or equal to, M. It will be noted that in some embodiments, M' can be larger than M, e.g., where the mapping of a M real disks into M' mapped disks portions comprises use of a part of one of the M disks, for example, where 10 real disks (M=10) are mapped into 17 mapped disk portions (M'=17), 11 mapped disk portions (M'=11), 119 mapped disk portions (M'=119), etc. In these other embodiments, the mapped cluster can be smaller than the real cluster. Moreover, where the mapped cluster is sufficiently small in comparison to the real cluster, the real cluster can accommodate one or more additional mapped clusters. In an aspect, where mapped cluster(s) are smaller than a real cluster, the mapped cluster can provide finer granularity of the data storage system. As an example, where the real cluster is 8×8, e.g., 8 nodes by 8 disks, then, for example, four mapped 4×4 clusters can be provided, wherein each of the four mapped 4×4 clusters is approximately ¼th the size of the real cluster. As a second example, given an 8×8 real cluster 16 mapped 2×2 clusters can be provided where each mapped cluster is approximately ¹⁄₁₆th the size of the real cluster. As a third example, for the 8×8 real cluster, 2 mapped 4×8 or 8×4 clusters can be provided and each can be approximately ½ the size of the real cluster. Additionally, the example 8×8 real cluster can provide a mix of different sized mapped clusters, for example one 8×4 mapped cluster, one 4×4 mapped cluster, and four 2×2 mapped clusters. In some embodiments, not all of the real cluster must be comprised in a mapped cluster, e.g., an example 8×8 real cluster can comprise only one 2×4 mapped cluster with the rest of the real cluster not (yet) being allocated into mapped storage space.

Other aspects of the disclosed subject matter provide additional features generally not associated with real cluster data storage. In some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a further example, a mapped cluster can comprise storage space from a first cluster having hardware nodes in a first data center in Seattle, Wash., and a second data center having hardware nodes in Tacoma, Wash. As another example, a mapped cluster can comprise storage space from a first cluster having hardware nodes in a first data center in Houston, Tex., and a second cluster having hardware nodes in a data center in Mosco, Russia.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate storage of data in a mapped redundant array of independent data storage regions, in accordance with aspects of the subject disclosure. System 100 can comprise a cluster storage construct 102, which can be embodied in a cluster storage system facilitating a mapped redundant array of independent data storage regions which can be comprised of real or mapped clusters comprised of real or mapped nodes of real storage devices. In an embodiment, cluster storage construct 102 can be embodied via a real cluster storage system comprising one or more hardware nodes that each comprise one or more storage devices, e.g., hard disks, optical storage, solid state storage, etc. The storage devices can form a storage device pool. The storage device pool can be comprised of storage devices in disparate geographical locations to provide data protection via geographic diversity via a protection set, e.g., a data and backup data, data and corresponding erasure coding fragments, etc.

Cluster storage construct 102 can receive data for storage in a cluster, herein data 104 for brevity. Data 104 can be stored by portions of the one or more storage devices of cluster storage construct 102 according to a logical mapping of the storage space, e.g., according to one or more mapped clusters, according to one or more real clusters, etc., wherein the clusters can be comprised of storage devices in storage sites of a region or a mapped region. In an aspect, the term site can be substituted for the term storage site. Where the clusters are comprised in storage devices of a mapped region, e.g., via storage sites in two or more regions, the storage can be said to be via a mapped redundant array of independent data storage regions.

In an aspect, a mapped cluster can be a logical allocation of storage space of cluster storage construct 102. In an embodiment, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc. Accordingly, in an embodiment, cluster storage construct 102 can support a mapped cluster enabling data 104 to be stored on one or more disk, e.g., first disk component 140 through M-th disk component 148 of first cluster node component 130 through first disk component 150 through M-th disk component 158 of N-th cluster node component 138 of first cluster storage component (CSC) 110, through disks corresponding to CSCs of L-th cluster storage component 118, according to a mapped cluster schema. In an aspect, a mapped cluster control component, e.g., mapped cluster control component 220-620, etc., can coordinate storage of data 104 on storage elements, e.g., disks, of a real cluster of cluster storage construct 102 according to a mapping of a mapped cluster, e.g., mapped cluster control component 220-620, etc., can indicate where in cluster storage construct 102 data 104 is to be stored, cause data 104 to be stored at a location in in cluster storage construct 102 based on the mapping of the mapped cluster, etc.

In an embodiment, a mapped cluster employing cluster storage construct 102 can be comprised in one or more portions of one or more real cluster, e.g., a portion of one or more disks of first CSC 110-L-th CSC 118, etc. Moreover, the mapped cluster can be N' nodes by M' disks in size and the one or more real clusters of cluster storage construct 102 can be N nodes by M disks in size, where N' can be less than, or equal to, N, and M' can be less than, or equal to, or greater than, M. In these other embodiments, the mapped cluster can be smaller than cluster storage construct 102. Moreover, where the mapped cluster is sufficiently small in comparison to cluster storage construct 102, one or more additional mapped clusters can be accommodated by cluster storage construct 102. In an aspect, where mapped cluster(s) are smaller than cluster storage construct 102, the mapped cluster can provide finer granularity of the data storage system. As an example, where cluster storage construct 102 is 8×8, e.g., 8 nodes by 8 disks, then, for example, four mapped 4×4 clusters can be provided, wherein each of the four mapped 4×4 clusters is approximately ¼th the size of cluster storage construct 102. As a second example, given an 8×8 cluster storage construct 102, 16 mapped 2×2 clusters can be provided where each mapped cluster is approximately ¹⁄₁₆th the size of cluster storage construct 102. As a third example, for the example 8×8 cluster storage construct 102, two mapped 4×8 or 8×4 clusters can be provided and each can be approximately ½ the size of cluster storage construct 102. Additionally, the example 8×8 cluster storage construct 102 can provide a mix of different sized mapped clusters, for example one 8×4 mapped cluster, one 4×4 mapped cluster, and four 2×2 mapped clusters. In some embodiments, not all of the storage space of cluster storage construct 102 must be allocated in a mapped cluster, e.g., an example 8×8 cluster storage construct 102 can comprise only one 4×4 mapped cluster with the rest of cluster storage construct 102 being unallocated, differently allocated, etc.

In some embodiments, a mapped cluster can comprise storage space from more than one real cluster, e.g., first CSC 110 through L-th CSC 118 of cluster storage construct 102. In some embodiments, a mapped cluster can comprise storage space from real nodes, e.g., first cluster node component 130, etc., in different geographical areas. In some embodiments, a mapped cluster can comprise storage space from more than one real cluster in more than one geographic location, e.g., a mapped cluster can comprise storage space from sites in mapped regions of a mapped RAIR. As an example, a mapped cluster can comprise storage space from a cluster having hardware nodes in a data center in Denver, e.g., where first CSC 110 is embodied in hardware of a Denver data center. In a second example, a mapped cluster can comprise storage space from a first cluster having hardware nodes in a first data center in Denver and from a second cluster also having hardware nodes in the first data center in Denver, e.g., where first CSC 110 and L-th CSC 118 are embodied in hardware of a Denver data center. As a further example, a mapped cluster can comprise storage space from both a cluster having hardware nodes in a first data center in Denver and a second data center in Denver e.g., where first CSC 110 is embodied in first hardware of a first Denver data center and where L-th CSC 118 is embodied in second hardware of a second Denver data center. As a further example, a mapped cluster can comprise storage space from a first cluster having hardware nodes in a first data center in Seattle, Wash., and a second data center having hardware nodes in Tacoma, Wash., e.g., where first CSC 110 is embodied in first hardware of a first Seattle data center and where L-th CSC 118 is embodied in second hardware of a second Tacoma data center. As another example, a mapped cluster can comprise storage space from a first cluster having hardware nodes in a first data center in Houston, Tex., and a second cluster having hardware nods in a data center in Mosco, Russia e.g., where first CSC 110 is embodied in first hardware of a first Houston data center and where L-th CSC 118 is embodied in second hardware of a second Mosco data center.

In an aspect, a mapped cluster control component, e.g., 220, 320, etc., can allocate storage space of cluster storage component 102 based on an indicated level of granularity. In an aspect, this indicated level of granularity can be determined based on an amount of data to store, a determined level of storage space efficiency for storing data 104, a customer/subscriber agreement criterion, an amount of storage in cluster storage construct 102, network 'proximity', geographic proximity, network/computing resource costs, wherein costs can be monetary costs, heat costs, energy costs, maintenance costs, equipment costs, real property/rental/lease cost, or nearly any other costs. In an aspect, these types of information can be termed 'supplemental information', e.g., 222-422, etc., and said supplemental information can be used to allocate mapped storage space in a mapped cluster in a mapped region of a mapped RAIR. In some embodiments, allocation can be unconstrained, e.g., any space of cluster storage component 102 can be allocated into a mapped cluster. In other embodiments, constraints can be applied, e.g., a constraint can be employed by a mapped cluster control component to select or reject the use of some storage space of cluster storage construct 102 when allocating a mapped cluster. As an example, a constraint can restrict allocating two mapped clusters that each use a disk from the same real node, because difficulty accessing the real node can result in effects on two mapped clusters. As another example, a constraint can restrict allocating two sites of a real region to more than one mapped region of a mapped RAIR, because difficulty accessing the real region can result in difficulty accessing data on the mapped RAIR. Other constraints can be readily appreciated, for example, based on a type of data redundancy schema, based on available/use storage space, based on network/computing resource costs, etc., and all such constraints are within the scope of the instant disclosure even where not recited for clarity and brevity.

Figure 2:
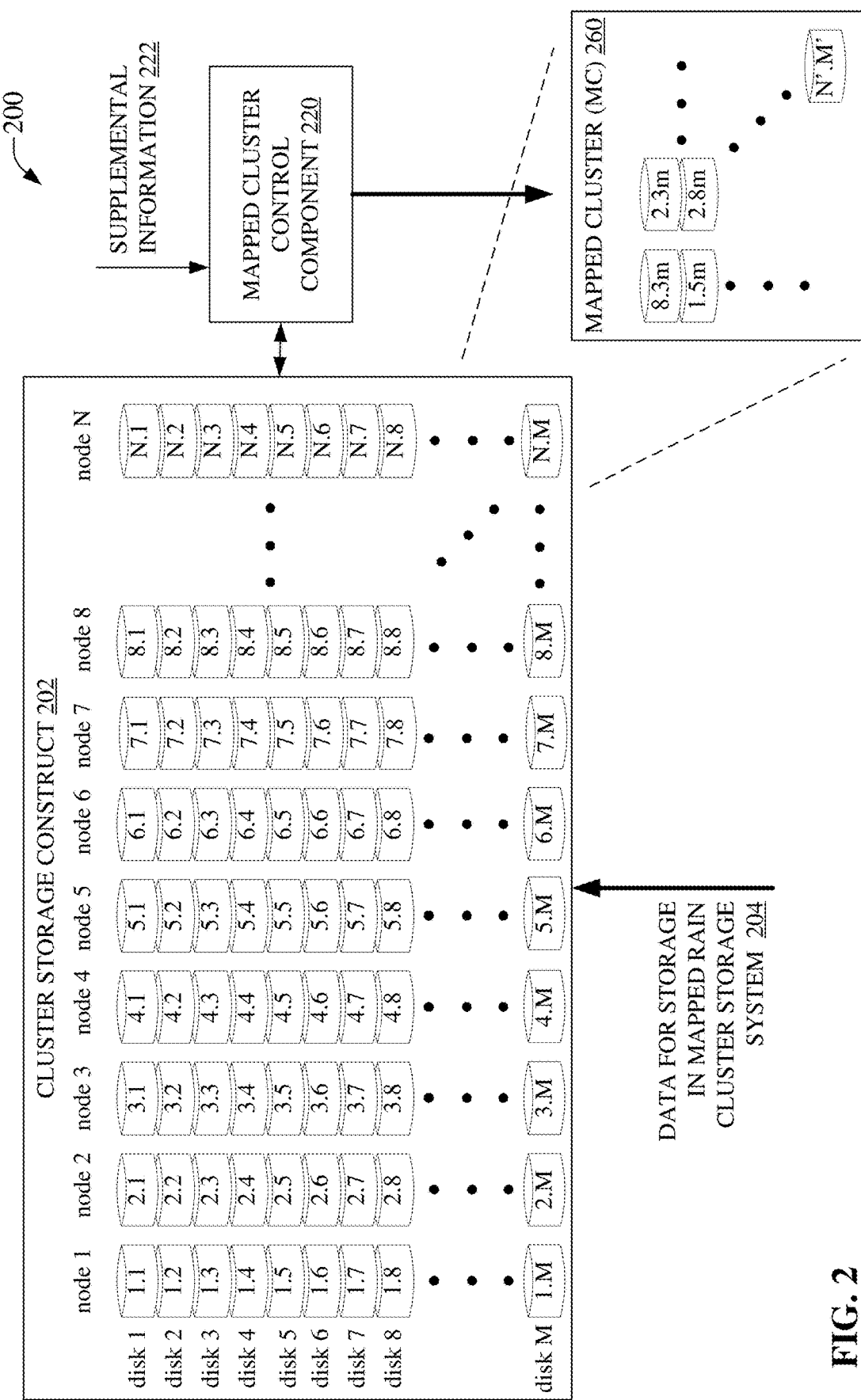
FIG. 2 is an illustration of an example system that can facilitate storage of data in a mapped cluster of a region of a mapped redundant array of independent data storage regions, in accordance with aspects of the subject disclosure.

FIG. 2 is an illustration of a system 200, which can enable storage of data in a mapped cluster of a region of a mapped redundant array of independent data storage regions, in accordance with aspects of the subject disclosure. System 200 can comprise cluster storage construct 202 that can be the same as, or similar to, cluster storage construct 102. Cluster storage construct 202 is illustrated at the disk and node level for ease of understating, e.g., disk 1.1 of disk 1 and node 1, for example, can be embodied in first disk component 140, disk 2.1, for example, can be embodied in first disk component 150, disk N.M, for example, can be embodied in a disk component of L-th CSC 118, etc. As is illustrated in this example embodiment, cluster storage construct 202 can comprise N nodes of M disks, e.g., disk 1,1 to N.M, etc. The N×M disks can be comprised in sites of regions, e.g., in real or mapped regions.

Mapped cluster control component 220 can be communicatively coupled to, or be included in, cluster storage construct 202. Mapped cluster control component 220 can allocate mapped cluster (MC) 260, which can logically embody storage comprised in cluster storage construct 202. In an embodiment, MC 260 can be allocated based on supplemental information 222. MC 260 can be embodied in a region, mapped region, etc. As an example, supplemental information 222 can indicate a first amount of storage is needed and mapped cluster control component 220 can determine a number of, and identity of, disks of cluster storage construct 202 that satisfy the first amount of storage. This example mapped cluster control component 220 can accordingly allocate the identified disks as MC 260, e.g., disk 8.3 m can correlate to an allocation of disk 8.3, 2.3 m can correlate to an allocation of disk 2.3, . . . , disk N'.M' can correlate to an allocation of disk N.M, etc. Further, mapped cluster control component 220 can allocated disks that can be comprised in a site(s), in a site(s) of a region, in a site(s) of a mapped region, etc. As an example, it can be more network efficient to allocate disk 8.3 m, 2.3 m, etc., where disk 8.3, 2.3,etc., can be part of a same site where the network proximity of disks disk 8.3, 2.3, etc., can be less than other disks that are not in the same site and where the more proximate disks of the same site can be determined to have better network performance than disks in different sites, e.g., where the disks are in the same site they can communicate faster than having to communicate between different sites, for example where the disks are on the same intranet of the site rather than having to go through a network carrier network to reach disks in other sites, etc. In another example, a customer can request, which information can be included in supplemental information 222, that the disks be preferably selected from a same site, region, etc., e.g., the customer can desire that their data be kept in a particular legal/political jurisdiction, etc.

Mapped cluster control component 220 can facilitate storage of data 204 via MC 260 in the allocated storage areas of cluster storage construct 202. As such, data 204 can be stored in a more granular storage space than would conventionally be available, e.g., conventionally all disks of node 1 can be used to store data 204 even where the 1 to M disk available storage space can far exceed an amount of storage needed, e.g., as indicated by the above example first amount of storage. As such, by mapping portions of a disk from a node into MC 260, a lesser amount of storage space can be made available for storing the example first amount of storage. As an example, where a conventional storage cluster can allocate a minimum block of 1.2 petabytes, this can far exceed the example first amount of storage, such as where the first amount of storage can be related to storing a log file, moving data units from legacy systems that employed smaller storage unit sizes, etc., and accordingly, allocating and facilitating storage of data into MC 260, where MC 260 can have minimum block sizes less than the example 1.2 petabytes, can be desirable.

Figure 3:
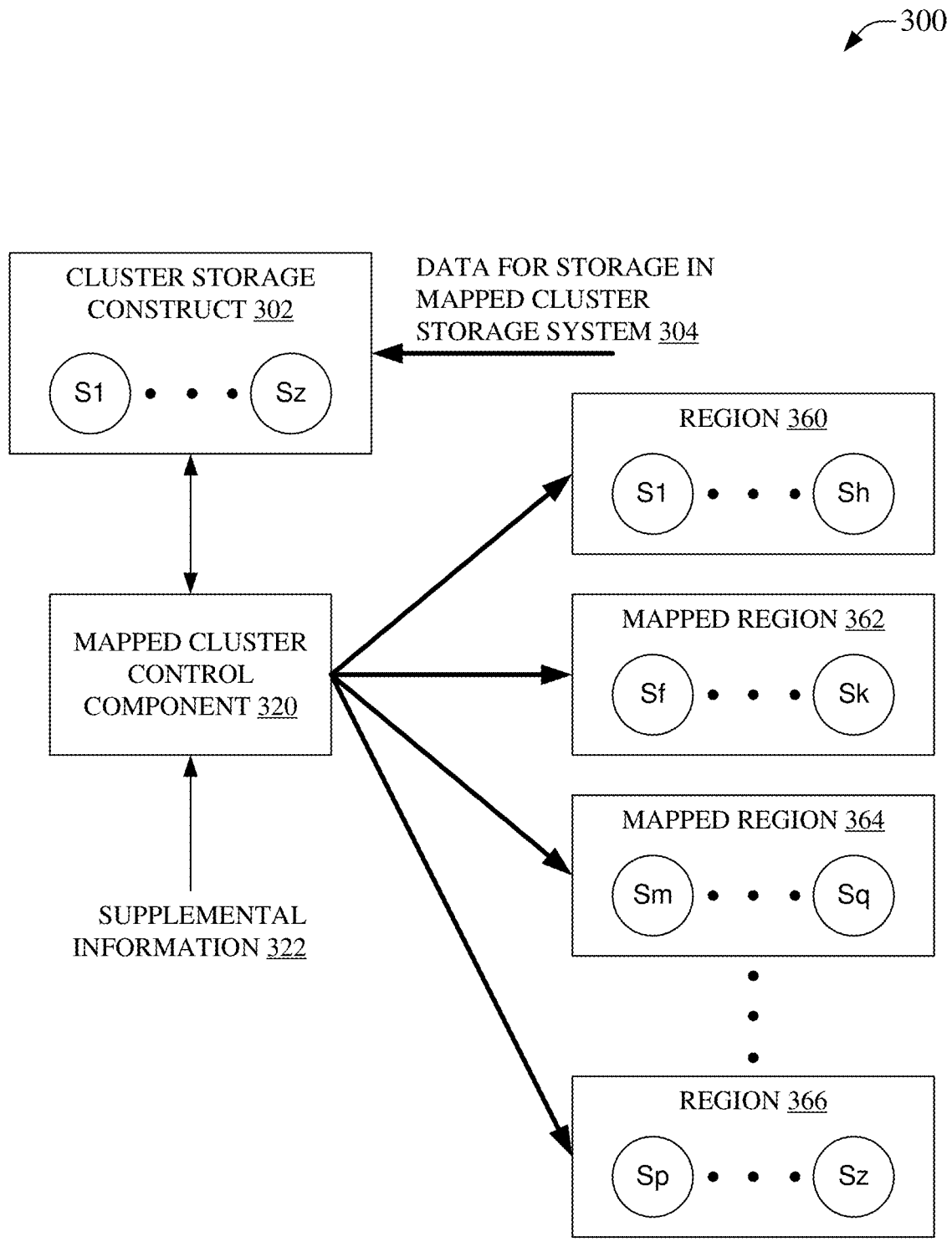
FIG. 3 is an illustration of an example system that can enable storage of data in a plurality of regions via a mapped redundant array of independent data storage regions, in accordance with aspects of the subject disclosure.

FIG. 3 is an illustration of a system 300, which can facilitate storage of data in a plurality of regions via a mapped redundant array of independent data storage regions, in accordance with aspects of the subject disclosure. System 300 can comprise cluster storage construct 302 that can comprise disk portions 1.1 to N.M in a manner that is the same as, or similar to, cluster storage construct 202. Mapped cluster control component 320 can allocate one or more MC in one or more regions, mapped regions, etc., e.g., region 360, mapped region 362, mapped region 264, region 366, etc. In an embodiment, allocation of MC 360-362 can be based on supplemental information 322 received by mapped cluster control component 320. For brevity and clarity where discussion at the disk level can be burdensome, and where it is established that disks can be comprised in sites, cluster storage construct 302 can be indicated as comprising sites, e.g., S1 . . . Sz, etc., wherein each site can comprise one or more disks or other storage devices, in one or more clusters of one or more nodes, etc.

System 300 can comprise regions or mapped regions that can be determined, designated, etc., via mapped cluster control component 320, for example, based on supplemental information 322, e.g., region/mapped region 360-366, etc. These regions/mapped regions can be allocated sites of cluster storage construct 302. As an example, region 360 can comprise sites S1-Sh, mapped region 362 can comprise sites Sf-Sk, mapped region 364 can comprise sites Sm-Sq, region 366 can comprise sites Sp-Sz, etc. It is noted that mapped regions can comprise sites from different regions. As an example, site Sf of mapped region 362 can be comprised in region 360 and site Sk of mapped region 362 can be comprised in a region other than region 360. As another example, site Sm of mapped region 364 can be comprised in a region other than region 366 and sites Sp and Sq of mapped region 364 can be comprised in region 366. Accordingly, in some embodiments, storage of client/customer data in a mapped region can comprise storage of the client customer data via sites in more than one real region, albeit all sites are comprised of portions of storage devices in the N×M disk pool of cluster storage construct 302.

Incoming data for storage, e.g., data 304, etc., can then be stored according to the mapping of regions/mapped regions based on one or more indications from mapped cluster control component 320, e.g., mapped cluster control component 320 can orchestrate or facilitate storage of data 304, etc., into an appropriate disk portion of a node, of a cluster, mapped cluster, etc., that is designated in a site of a region/mapped region, allowing data 304 to be stored according to a mapping to a corresponding storage area of cluster storage construct 302.

In an embodiment, the storage size of regions, e.g., 360-364, etc., can be the same or different, e.g., the storage size of region 360 can be the same or different from the storage size of mapped region 362, mapped region 364, region 366, etc. In an embodiment, the geographic footprint of regions, e.g., 360-364, etc., can be the same or different, e.g., the geographic footprint of region 360 can be the same or different from the geographic footprint of mapped region 362, mapped region 364, region 366, etc. In an embodiment, the geographic proximity between sites of a region, e.g., 360-364, etc., can be the same or different, e.g., the geographic proximity between sites S1-Sh of region 360 can be the same or different from the geographic proximity between sites Sf-Sk of mapped region 362, sites Sm-Sq of mapped region 364, sites Sp-Sz of region 366, etc. In an embodiment, the network 'proximity' between sites of a region, e.g., 360-364, etc., can be the same or different, e.g., the network 'proximity' between sites S1-Sh of region 360 can be the same or different from the network 'proximity' between sites Sf-Sk of mapped region 362, sites Sm-Sq of mapped region 364, sites Sp-Sz of region 366, etc.

In an aspect, mapped cluster control component 320 can, in some embodiments, determine sites for a mapped region according to one or more rules, best practices, etc., which can be applied based on characteristics, measurements, performance indications of storage devices of cluster storage construct 302, e.g., at the storage device level, node level, cluster level, site level, etc. As an example, mapped cluster control component 320 can select sites Sf-Sk of mapped region 362 to be more network proximate, e.g., have faster, more reliable, lower latency, etc., network connections than other possible selectable sites for inclusion in mapped region 362. In an aspect, this can be facilitated by ranking inter-site performance metrics, etc. As an example, network proximity between site Sf and Sk can be better ranked than between sites Sf and Sd, such that, according to a selection rule employed by mapped cluster control component 320, sites Sf and Sk are more likely to be included in mapped region 362 than sites Sf and Sd. In an embodiment, the characteristics, measurements, performance indications of storage devices of cluster storage construct 302, e.g., at the storage device level, node level, cluster level, site level, etc., can be comprised in supplemental information 322.

Figure 4:
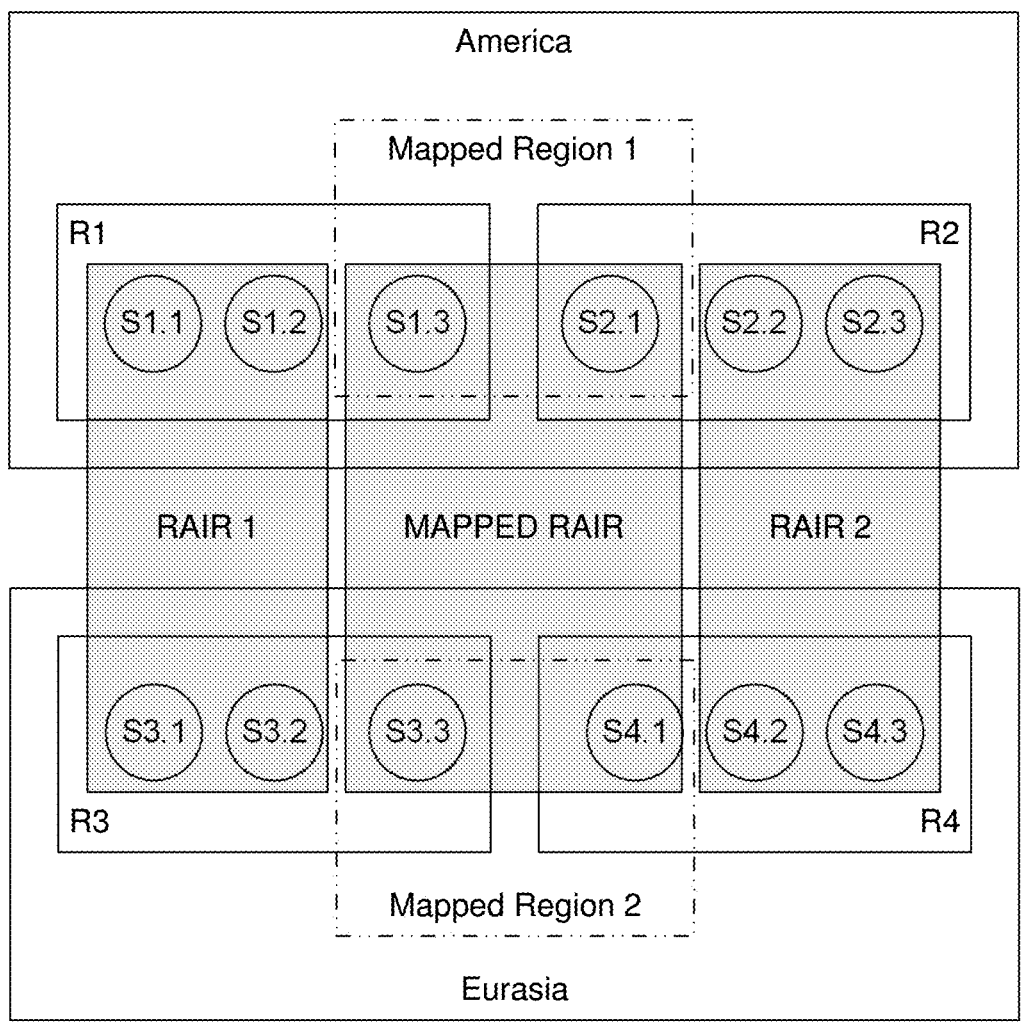
FIG. 4 illustrates an example system comprising a mapped redundant array of independent data storage regions, in accordance with aspects of the subject disclosure.

FIG. 4 is an illustration of a system 400, which can comprise a mapped redundant array of independent data storage regions, in accordance with aspects of the subject disclosure. As is illustrated, system 400 can comprise two real regions in America, e.g., region R1 and R2, and two real regions in Eurasia, e.g., R3 and R4. Each real region, e.g., R1-R4, can comprise, for example, three sites, e.g., R1 can comprise S1.1. to S1.3, R2 can comprise S2.1 to S2.3,etc. In this example, cluster storage construct 402 can be said to comprise disk portions from twelve sites, where six sites are in in America and six sites are in Eurasia.

A redundant array of independent regions (RAIR), where the term RAIR can be inclusive of a mapped RAIR, can store data redundantly between different regions, e.g., enabling geographic diversity supporting data protection. As an example, RAIR 1 can store data on sites S1.1 and S1.2 in region R1 and store other data, e.g., redundant data, protection data, etc., in sites S3.1 and S3.2 in region R3. In this example, RAIR 1 can provide data protection, for example by backing up data stored in America at region R1 to regions R3 in Eurasia. In this example, if R1 becomes less accessible, for example where R1 is subjected to a network outage, a power outage, a hurricane, flood, earthquake, etc., then customer/client data can be recovered, accessed, etc., via corresponding data stored in R3, e.g., where the cause of the inaccessibility in R1 of America is unlikely to also impact the accessibility of data in R3 of Eurasia. Similarly, RAIR 2 can comprise sites in R2, e.g., S2.2. and S2.3,and in R4, e.g., S4.2 and S4.3.

Allocation of RAIR 1 and RAIR 2, in example system 400, can leave sites S1.3, S2.1, S3.3, and S4.1. Where another RAIR to be implemented, and where that RAIR would comprise two sites in America and two sites in Eurasia, the RAIR does not have sufficient sites in either R1 or R2 of America, nor in either of sites R3 or R4 of Eurasia, to implement the desired RAIR. However, according to the disclosed subject matter, a mapped RAIR can be created by mapping S1.3 and S2.1 into a region, e.g., mapped region 1, and mapping S3.3 and S4.1 into another region, e.g., mapped region 2, which mapped regions can be employed in facilitating the indicated mapped RAIR having two American sites in a region, e.g., mapped region 1, and two Eurasian sites in a region, e.g., mapped region 2. In an aspect, regions R1 through R4 can comprise more than just three sites, and a sites to be included in a mapped region can be selected, for example, based on rules, best practices, etc., as disclosed herein. As an example, S1.3 and S2.1 can be selected for mapped region 1 due to being more network proximate, e.g., having better network characteristics, etc., than for other possible not illustrated sites of R1 and R2. In an embodiment, the selection can be performed based on supplemental information, e.g., 222, 322, etc., by a mapped cluster control component, e.g., 220, 320, etc.

In an embodiment, allocation of sites can be constrained. In an aspect, a constraint on allocation can be related to preventing data loss events, e.g., applying best practices to data storage. It will be noted that where sites of one real region, e.g., R1, R2, R3, R4, etc., are allocated to different mapped regions of a mapped RAIR, then a regional impairment of access to data can cause impairment to data access of the resulting mapped RAIR. Accordingly, it can be prohibited to assign two sites of a region to different mapped regions of a mapped RAIR. Other examples of constraints can be appreciated by one of skill in the art and all such constraints are within the scope of the disclosed subject matter even where not explicitly recited for the sake of clarity and brevity.

Figure 5:
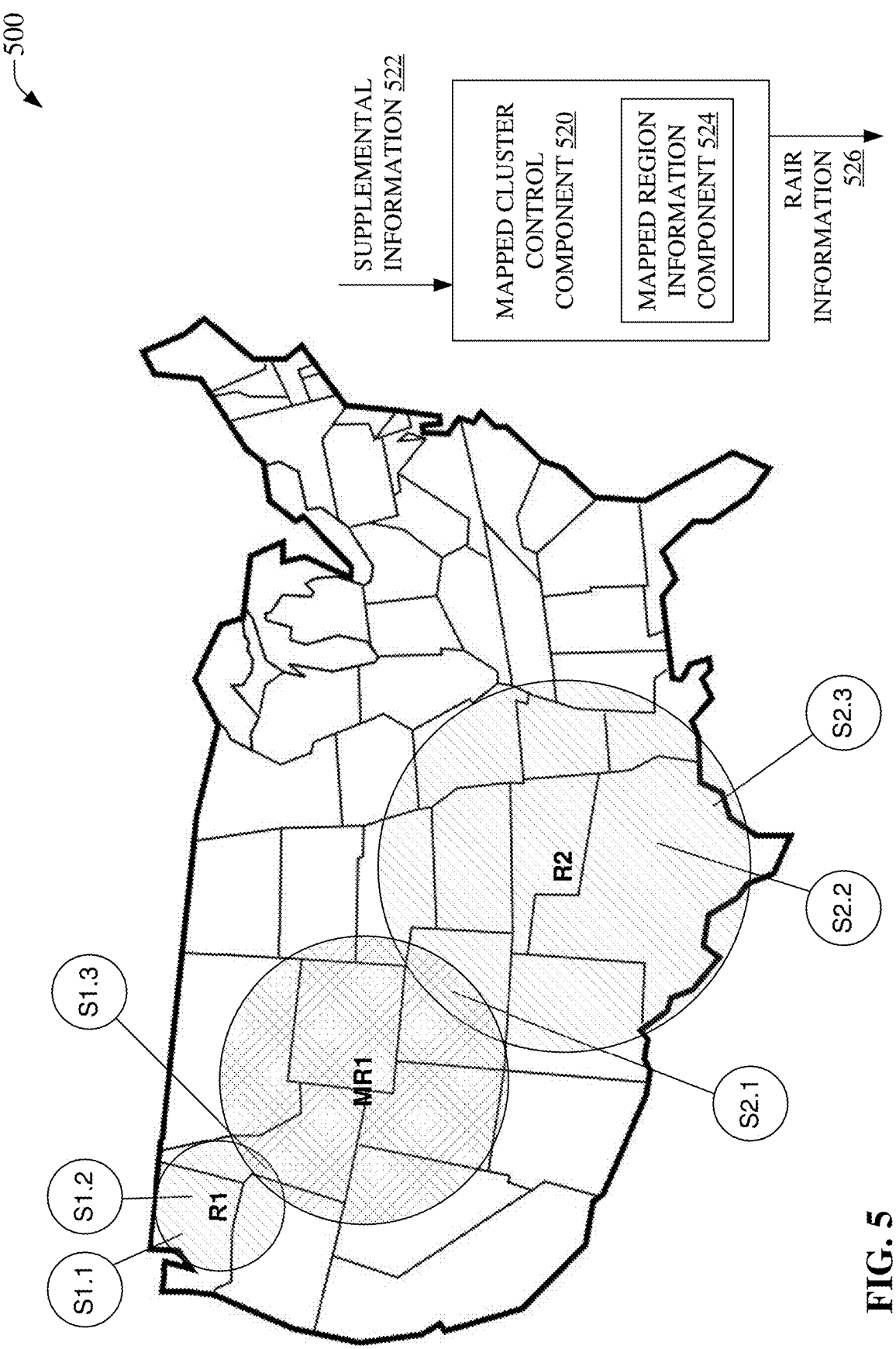
FIG. 5 illustrates a portion of an example system facilitating a mapped redundant array of independent data storage regions for storage of data, in accordance with aspects of the subject disclosure.

FIG. 5 is an illustration of a system 500, which can enable a mapped redundant array of independent data storage regions for storage of data, in accordance with aspects of the subject disclosure. System 500 can represent storage sites in America. For example, site S1.1 can be in Seattle, S1.2 can be in Spokane, S1.3 can be in Boise, site S2.1 can be in Denver, S2.2 can be in Dallas, and S2.3 can be in Houston. System 500 illustrates circular regions R1 and R2, although it is noted that regions can be of any shape and are illustrated as circles only for simplicity of illustration. Sites S1.1 to S1.3 can be in R1, for example. Sites S2.1 to S2.3 can be in R2, for example.

In an embodiment, mapped cluster control component 520 can receive supplemental information 522. Mapped cluster control component 520 can generate RAIR information 526 that can comprise information indicating, defining, allocating, etc., a RAIR, mapped RAIR, etc. RAIR information 526 can be based on region information comprising information about 'real' regions, e.g., R1, R2, etc., mapped regions, e.g., MR1, etc. Mapped region information component 524 can determine mapped regions, for example, based on supplemental information 522, etc. In an example, supplemental information 522 can indicate geographic locations of S1.1 through S2.3 such that mapped region information component 524 of mapped cluster control component 520 can determine that S1.3 and S2.1 are geographically most proximate of the six sites and can enable mapped cluster control component 520 to generate RAIR information 526 that can employ MR1 comprising S1.3 and S2.1 as part of a mapped RAIR, for example Mapped RAIR of system 400 where MR1 can correspond to mapped region 1. As another example, not illustrated for clarity and brevity, a fast network connection can exist between Seattle and Dallas such that S1.1. and S2.2 are more network proximate than other sites and, accordingly, S1.1 and S2.2 can be comprised in a mapped region because they can experience better network performance than for example between Boise and, e.g., S1.3, and Denver, e.g., S2.1, that, for example, may not have as high a network proximity where they can lack as large network backbone connection between those sites as can exist between Seattle and Dallas. For the illustrated MR1, this can correspond to a portion of a mapped RAIR, for example where another portion of the example mapped RAIR can be located in Eurasia, etc., e.g., for example, as mapped region 2 in system 400.

Figure 6:
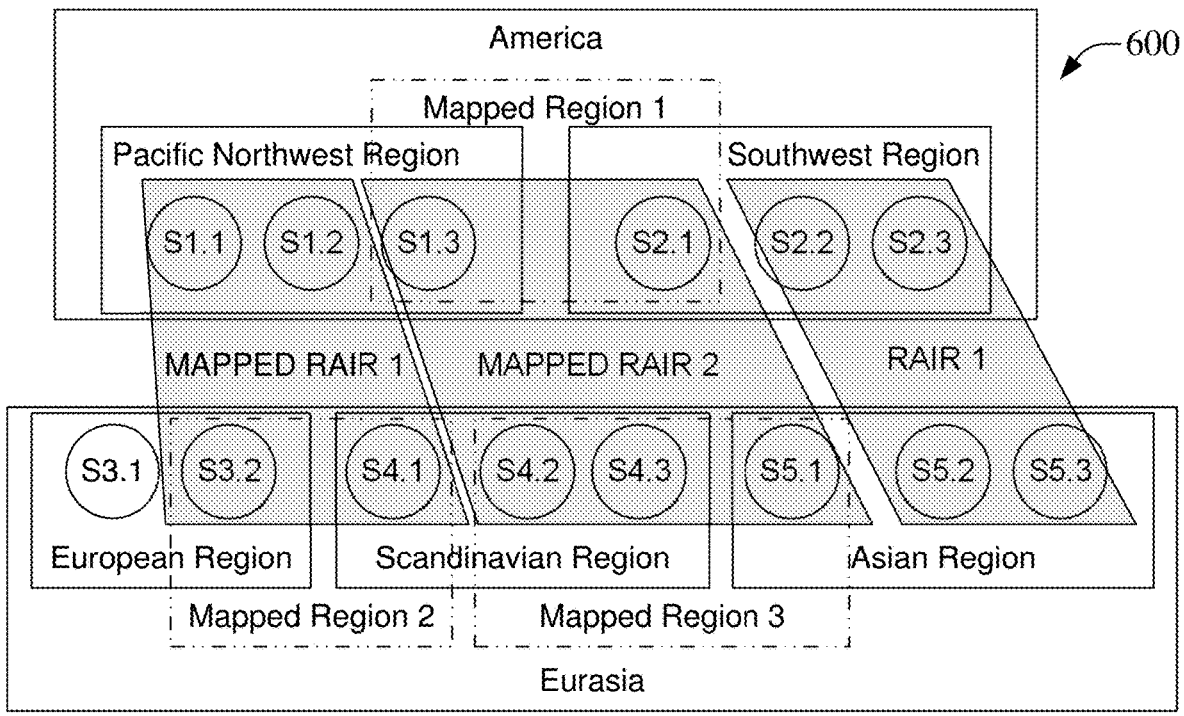
FIG. 6 illustrates example systems comprising multiple mapped regions in a data storage system that can employ a mapped redundant array of independent data storage regions across different geographic areas, in accordance with aspects of the subject disclosure.
Figure 6:
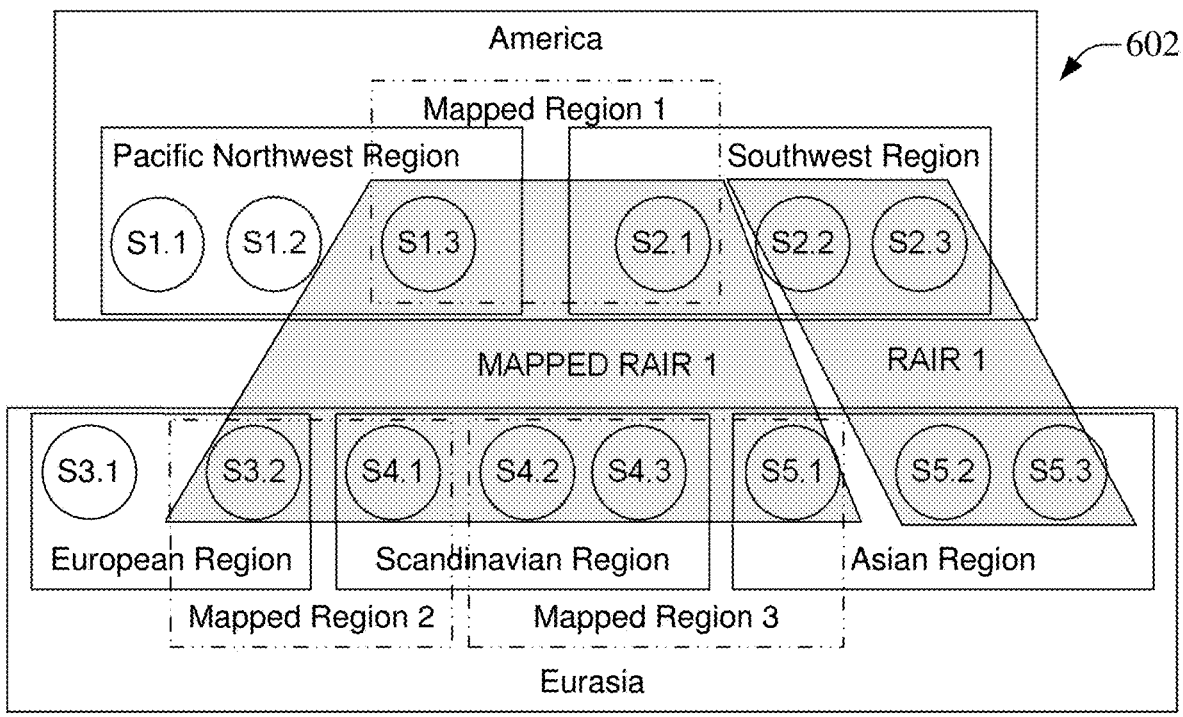

FIG. 6 can illustrate example systems, e.g., 600, 602, etc., comprising multiple mapped regions in a data storage system that can employ a mapped redundant array of independent data storage regions across different geographic areas, in accordance with aspects of the subject disclosure. System 600 can comprise sites S1.1 through S5.3, which can be in the five determined regions, as illustrated, e.g., the Pacific Northwest region, the Southwest region, the European region, etc. RAIR 1 can for example, comprise S2.2. an S2.3 of the Southwest region and S5.2 and S5.3 of the Asian region, which can be similar to, or the same as, RAIR 2 illustrated in system 400.

In system 600 a mapped region, e.g., mapped region 1, can be determined. Mapped region 1 can comprise, for example, S1.3 of the Pacific Northwest region and S2.1 of the Southwest region, see, for example, MR 1 of system 500. Mapped region 1 can be part of mapped RAIR 2, which can further comprise sites of determined mapped region 3, e.g., S4.2 and S4.3 of the Scandinavian region and S5.1 of the Asian region. Mapped RAIR 2 can comprise two mapped regions. Mapped RAIR 1 can illustrate that the number of sites from a first region participating in a mapped RAIR, e.g., S1.1 and S1.2 of the Pacific Northwest region, etc., can be the same as the number of sites from a second region participating in the mapped RAIR, e.g., S3.2 and S4.1 of mapped region 2. Moreover, Mapped RAIR 2 illustrates that the number of sites in a first region, e.g., mapped region 1, etc., can be different from the number of sites on a second region, e.g., mapped region 3, etc. In an embodiment, a mapped RAIR can comprise sites from both a region and a mapped region. As an example, Mapped RAIR 1 can comprise two sites from a 'real' region, e.g., S1.1 and S1.2 of the Pacific Northwest region and two sites from a mapped region, for example mapped region 2, e.g., sites S3.2 of the European region and S4.1 of the Scandinavian region.

Turning to example system 602, which can have the same, or similar, sites in 'real' regions, RAIR 1 can be the same as in example system 600. However, example system 602 can illustrate a different mapped RAIR 1 than in example system 600. Mapped RAIR 1 can comprise sites from corresponding mapped regions 1, 2, and 3 of example system 602. While it is permissible for a mapped RAIR to comprise sites of more than two regions, some permutations can risk a data loss event that can be avoided by restricting designation of mapped RAIRs according to rules, best practices, etc. Example system 602 can illustrate a disfavored topology for mapped RAIR 1 because Mapped RAIR 1 comprises two sites of one 'real' region being selected in two mapped regions of the same mapped RAIR, e.g., mapped region 2 and mapped region 3 each comprise sites form the Scandinavian region. In this example, if the Scandinavian region becomes less accessible, e.g., a regional power outage, damage to a network element affecting the region, etc., then both mapped region 2 and mapped region 3 can be affected, which can result in a data loss event. As such, where a best practice can be to prohibit assigning two sites from the same real region to different mapped regions of a mapped RAIR, then designating mapped RAIR 1 of example system 602 as illustrated can be prohibited. Other constraints, best practices, rules, etc., can be enforced in designating a mapped RAIR and, even where not recited for clarity and brevity, these constraints, best practices, rules, etc., are to be considered within the scope of the presently disclosed subject matter.

Figure 7:
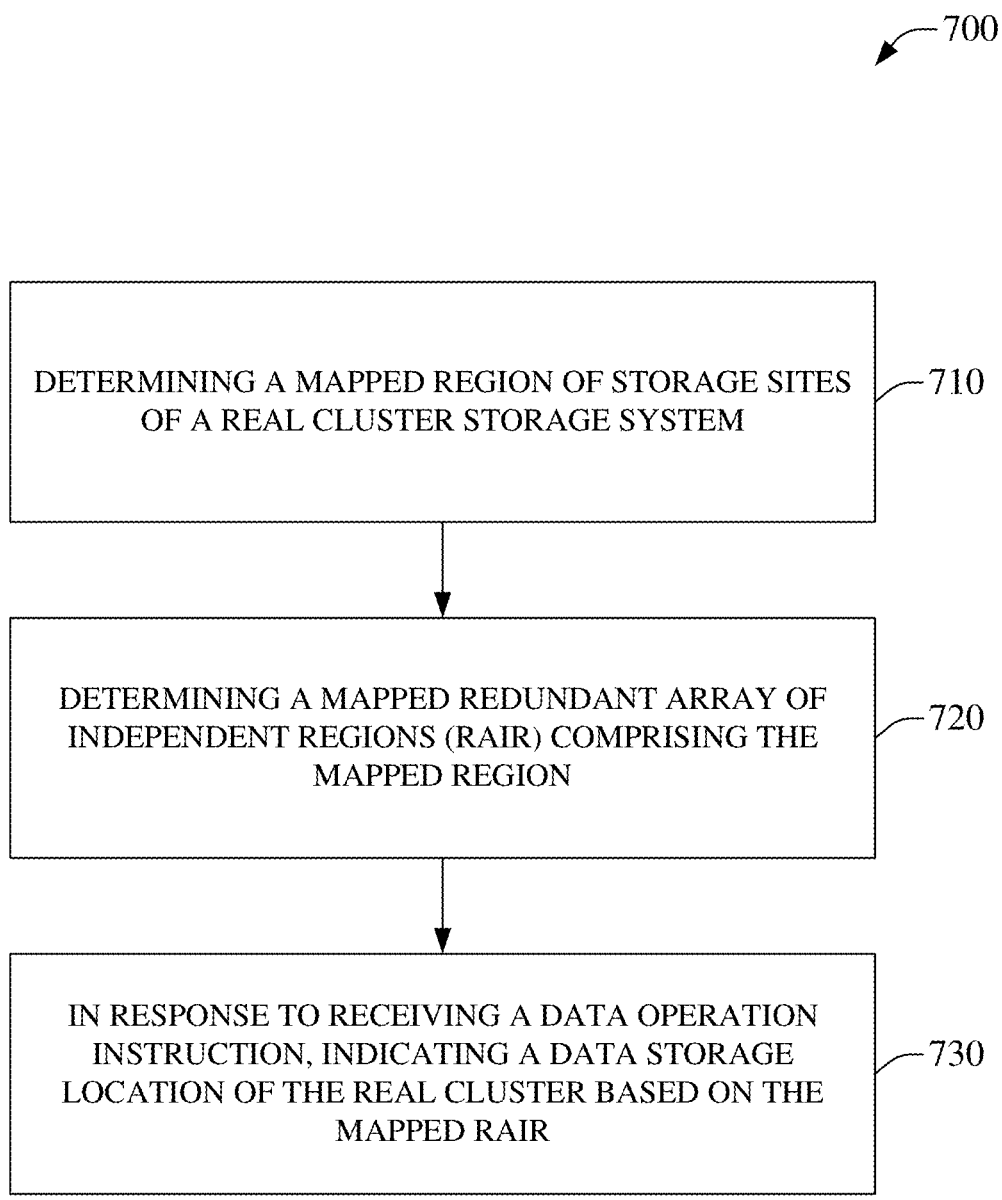
FIG. 7 is an illustration of an example method facilitating storage of data in a mapped redundant array of independent data storage regions, in accordance with aspects of the subject disclosure.
Figure 8:
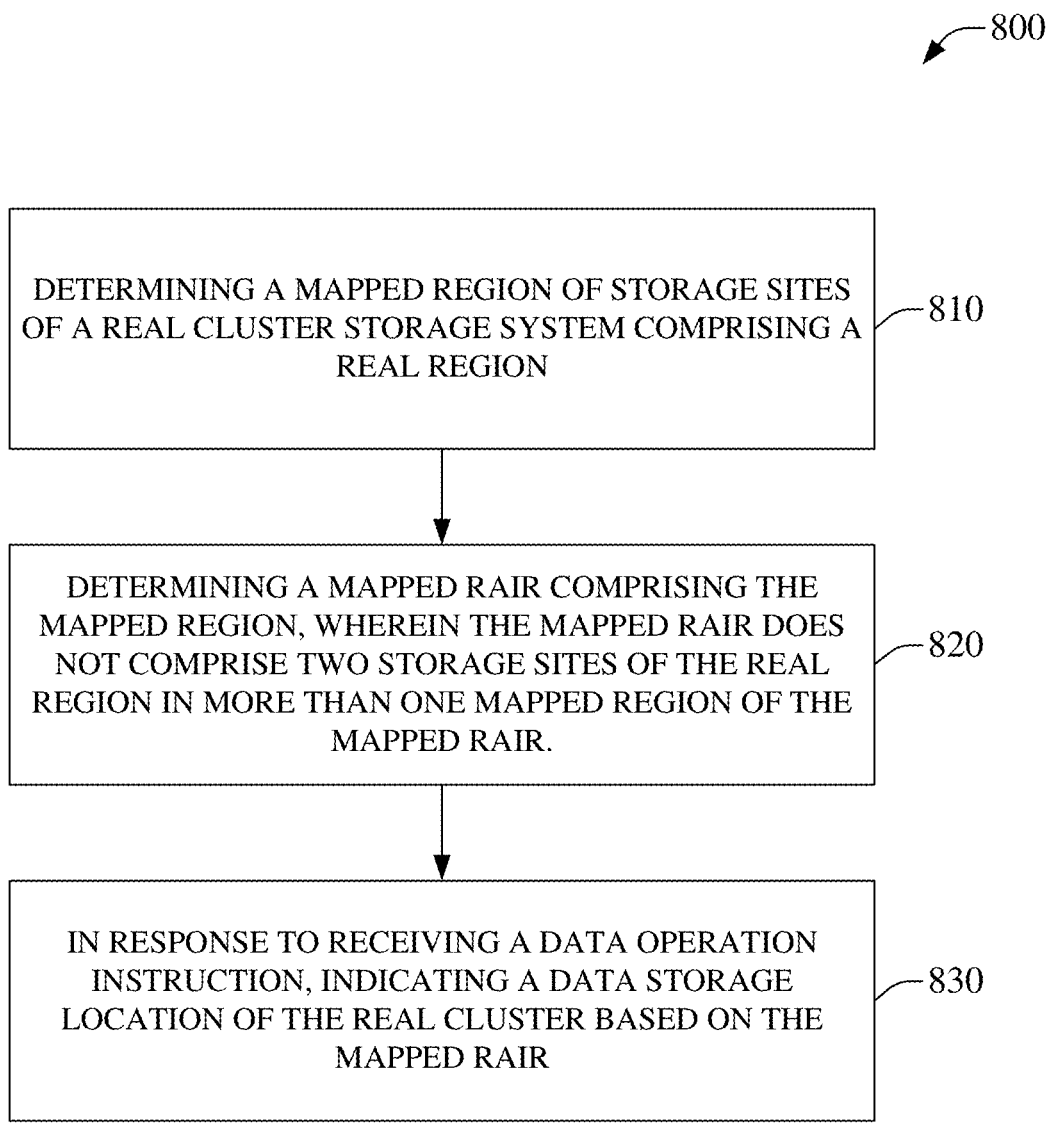
FIG. 8 illustrates an example method that facilitates a reduced occurrence of data loss events for data storage via a mapped redundant array of independent data storage regions, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate storage of data in a mapped redundant array of independent data storage regions, in accordance with aspects of the subject disclosure. At 710, method 700 can comprise determining a mapped region of storage sites of a real cluster storage system. A mapped region can comprise sites from two or more real regions. A real region can comprise storage sites according to a first criteria, first rule, first best practice, etc., while the sites of the mapped region can be selected, designated, etc., according to a second criteria, second rule, second best practice, etc. In an aspect, a mapped region can represent an abstraction of storage devices of a cluster storage system that is a different abstraction than that represented by a 'real' region. As an example, a real region can be a Texas region that can comprise storage sites located in the state of Texas, e.g., a geographical selection, while a mapped region can comprise a site located in Dallas and which is comprised in the Texas region and a site from Miami located in a Florida region, wherein the selection of the sites for the mapped region can be based on a network proximity, e.g., there can be faster network connectivity between the Dallas site and the Miami site than between a geographically closer Houston site and the Miami site.

Method 700, at 720, can comprise determining a mapped redundant array of independent regions (RAIR) comprising the mapped region determined at 710. A RAIR can provide for geographically distributed data storage to provide data protection. As an example, a RAIR can comprise sites in a region of America and other sites in a region of Eurasia, such that impairment of access to data in the American can be recovered from by access to data in the Eurasian. In an aspect, a RAIR can be implemented from sites of real regions. However, a mapped RAIR can be implemented to comprise sites from a mapped region. In an aspect, a mapped RAIR can therefore comprise sites from three or more real regions, e.g., sites from one real region and sites from a mapped region that itself comprises sites from at least two real regions, sites from two mapped regions that each themselves comprise sites from at least two real regions, sites from more than two mapped regions that again each themselves comprise sites from at least two real regions, etc. Some example mapped RAIR topology permutations are illustrated in systems 400, 500, 600, 602, etc.

At 730, system 700 can comprise indicating a data storage location of the real cluster storage system based on the mapped RAIR. The indicating can occur in response to receiving a data operation instruction and can enable the data operation instruction to be performed at the indicated data storage location. At this point, method 700 can end. In an aspect, the mapped RAIR can provide an abstraction of the real cluster storage system storage devices that can be different from RAIRs based on 'real' regions. In this aspect, the mapped RAIR can provide additional flexibility to the data storage system by enabling geographically diverse data storage that can protect the stored data. As an example, a client can request a RAIR that allows data be stored in a single region and be backed up in another geographically diverse region. In this example, where the amount of available storage in a real region is insufficient, a mapped region can be determined to provide a single region, e.g., the mapped region, which has sufficient capacity, wherein the mapped region can be backed up by a different geographically diverse second region. In this example, the second region can be a real region, a mapped region, etc. The resulting RAIR of this example can be a mapped RAIR, e.g., a RAIR that comprises a mapped region.

FIG. 8 is an illustration of an example method 800, which can enable a reduced occurrence of data loss events for data storage via a mapped redundant array of independent data storage regions, in accordance with aspects of the subject disclosure. At 810, method 800, can comprise determining a mapped region of storage sites of a real cluster storage system comprising a real region. A real region can comprise storage sites according to a first criteria, first rule, first best practice, etc., while the sites of the mapped region can be selected, designated, etc., according to a second criteria, second rule, second best practice, etc. A mapped region can comprise sites from two or more real regions. In an aspect, a mapped region can represent an abstraction of storage devices of a cluster storage system that is a different abstraction than that represented by a 'real' region.

Method 800, at 820, can comprise determining a mapped RAIR comprising the mapped region determined at 810. Selection of the sites comprising the mapped RAIR at 820 can be constrained. In an aspect, a RAIR can be implemented from sites of real regions. A mapped RAIR can be implemented to comprise sites from a mapped region that can comprise sites from two or more real regions. However, some mapped RAIR topologies can risk data loss events. As an example, a mapped RAIR that comprises two sites mapping to two mapped regions from one real region can risk the two mapped regions becoming impaired if the one real region becomes impaired. As such, this topology can be prohibited. Other topologies can also be prohibited, for example, based on best practices, rules, conditions, criteria, performance, etc., and all such constraints on mapped RAIRs is considered within the scope of the disclosed subject matter even where not explicitly recited for the sake of clarity and brevity.

At 830, system 800, in response to receiving a data operation instruction, can comprise indicating a data storage location of the real cluster storage system based on the mapped RAIR. The indicating can enable the data operation instruction to be performed at the indicated data storage location. At this point, method 800 can end. In an aspect, the mapped RAIR can provide a constrained abstraction of the real cluster storage system storage devices that can be different from RAIRs based on 'real' regions. In this aspect, the mapped RAIR can provide additional flexibility to the data storage system by enabling geographically diverse data storage that can protect the stored data.

Figure 9:
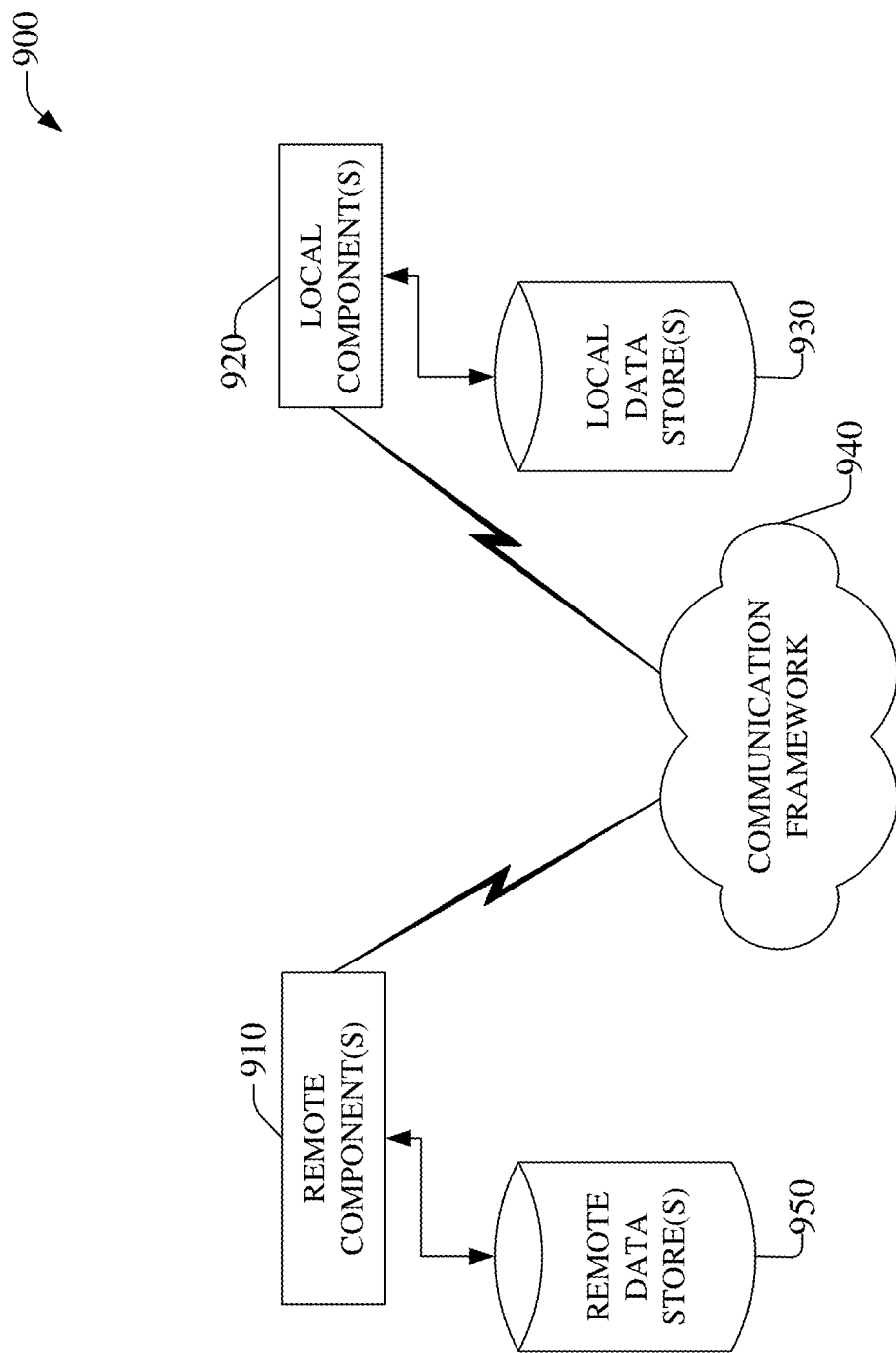
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located cluster storage device, e.g., disk component 140-148, 150-158, etc., cluster node component 130-138, etc., cluster storage component 110-118, etc., embodied in a cluster storage construct, such as 102, 202, 302, etc., connected to a mapped cluster control component, e.g., 220, 320, etc., via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local mapped cluster control component, e.g., 220, 320, etc., connected to a remotely located storage devices via communication framework 940. In an aspect the remotely located storage devices can be embodied in a cluster storage construct, such as 102, 202, 302, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s)

910 side of communication framework 940. Similarly, local component(s) 920 can be operably connected to one or more local data store(s) 930, that can be employed to store information on the local component(s) 920 side of communication framework 940. As an example, information corresponding to a mapped data storage location can be communicated via communication framework 940 to other devices, e.g., to facilitate access to a real data storage location, as disclosed herein.

Figure 10:
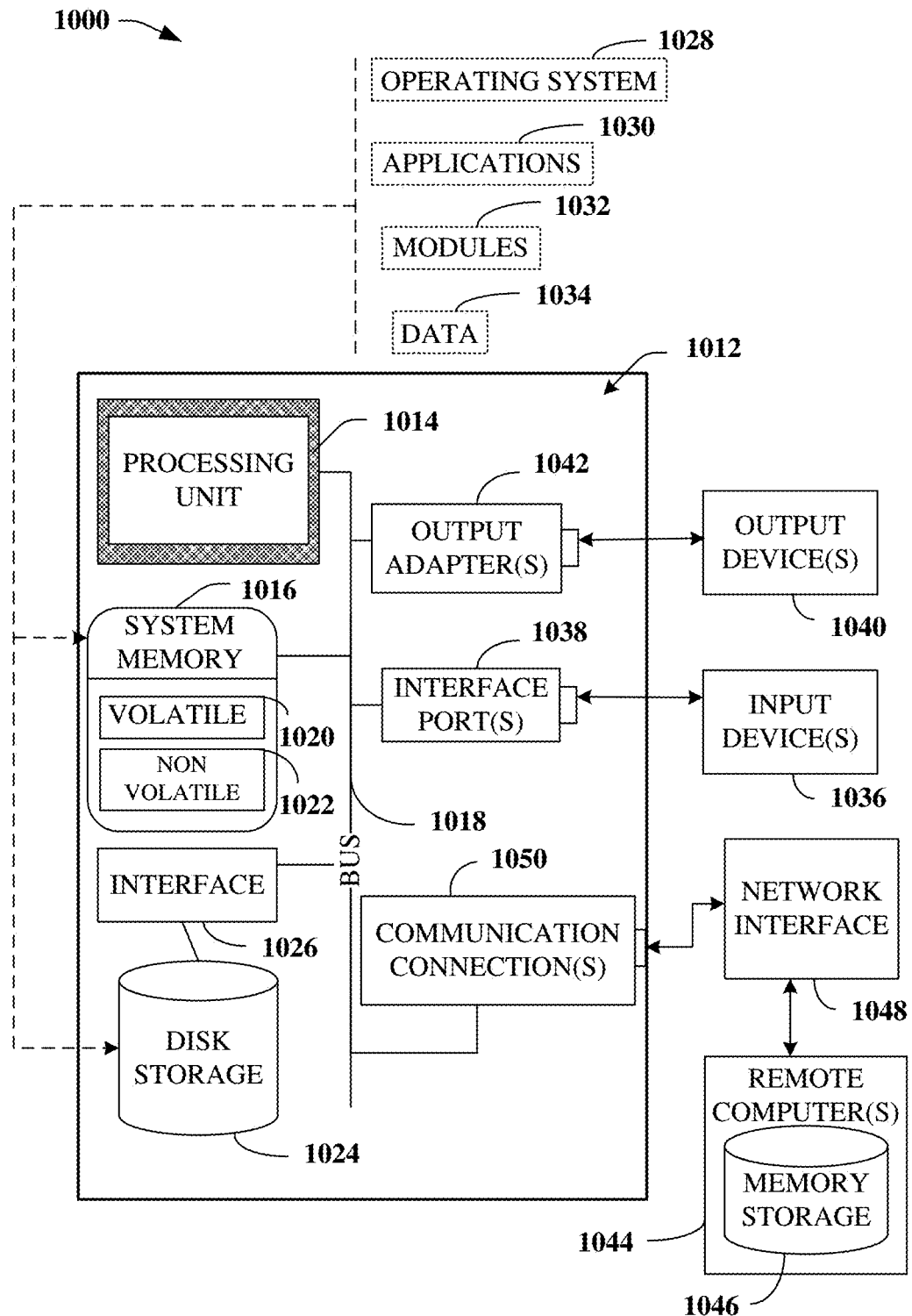
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any component of cluster storage construct 102, 202, 302, etc., in mapped cluster control component, e.g., 220, 320, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and non-volatile memory 1022. A basic input/output system, containing routines to transfer information between elements within computer 1012, such as during start-up, can be stored in nonvolatile memory 1022. By way of illustration, and not limitation, non-volatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a machine-readable medium can comprise executable instructions stored thereon that, in response to execution, can cause a system comprising a processor to perform operations, comprising determining a first mapped region, designating a first mapped redundant array of independent regions comprising the first mapped region, and initiating an occurrence of a data operation according to the first mapped redundant array of independent regions., as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining a first mapped region comprising first storage sites of a real storage system based on a first selection criterion, wherein the first storage sites comprise a first storage site comprised in a first real region of the real storage system and a second storage site comprised in a second real region of the real storage system;
determining a second mapped region comprising second storage sites of the real storage system based on a second selection criterion, wherein the second mapped region is a different mapped region than the first mapped region, wherein the second storage sites comprise at least a third storage site comprised in at least a third real region of the real storage system;
allocating storage space of the real storage system as a first mapped redundant array of independent regions, wherein the first mapped redundant array of independent regions comprises the first storage sites of the first mapped region and comprises the second storge sites of the second mapped region; and
facilitating a data operation corresponding to a data storage location according to the first mapped redundant array of independent regions, wherein the data storage location is comprised in the real storage system.

2. The system of claim 1, wherein the second storage sites comprise at least a fourth storage site comprised in at least a fourth real region of the real storage system.

3. The system of claim 1, wherein the firth storage sites comprise at least a fifth storage site comprised in at least a fifth real region of the real storage system.

4. The system of claim 3, wherein the first mapped region and the first real region are geographically distinct regions.

5. The system of claim 3, wherein the first real region is a same real region as the fifth real region.

6. The system of claim 1, wherein the first mapped region and the second mapped region are geographically distinct regions.

7. The system of claim 1, wherein the facilitating a data operation comprises accessing data stored according to the first mapped redundant array of independent regions.

8. The system of claim 1, wherein the real storage system comprises a redundant array of independent regions.

9. The system of claim 8, wherein the redundant array of independent regions comprises two or more real regions and does not comprise any mapped regions.

10. The system of claim 9, wherein a first storage capacity of the first mapped redundant array of independent regions is a different storage capacity than a second storage capacity of the redundant array of independent regions.

11. The system of claim 1, wherein the real storage system comprises a second mapped redundant array of independent regions.

12. The system of claim 11, wherein a first storage capacity of the first mapped redundant array of independent regions is a different storage capacity than a second storage capacity of the second mapped redundant array of independent regions.

13. The system of claim 12, wherein the selection criterion is selected from a group of criteria comprising a network speed criterion, network bandwidth criterion, and a network latency criterion.

14. The system of claim 12, wherein the selection criterion is selected from a group of criteria comprising a first geographic location, a first geographic proximity to another storage site, and a second geographic proximity to a second geographic location.

15. The system of claim 1, wherein the allocating storage space of the real storage system as the first mapped redundant array of independent regions is constrained according to a selection rule.

16. The system of claim 15, wherein the selection rule prohibits the allocating the storage space where the allocating the storage space results in two real storage sites of one real region being comprised in two mapped regions comprised in the first mapped redundant array of independent regions.

17. A method, comprising:
in response to determining a first mapped region of a of a real storage system, deploying, by a system comprising a processor, a first mapped redundant array of independent regions comprising the first mapped region, wherein the first mapped region comprises a first storage site of a first real region of the of a real storage system, wherein the first mapped region comprises a second storage site of a second real region of the of a real storage system, wherein the first storage site is selected for inclusion in the first mapped region based on a first criterion, and wherein the first storage site is further selected for inclusion in the first mapped redundant array of independent regions based on a second criterion; and
enabling a data operation to occur according to the first mapped redundant array of independent regions.

18. The method of claim 17, wherein the deploying the first mapped redundant array of independent regions comprises deploying the first mapped redundant array of independent regions further comprising at least one additional region selected from a group of regions comprising a third real region and a second mapped region.

19. A non-transitory storage medium, comprising executable instructions that, when executed by a processor, facilitate performance of operations, comprising:
determining a first mapped region of a real storage system, wherein the first mapped region comprises a first storage site of a first real region of the real storage system, and wherein the first mapped region comprises a second storage site of a second real region of the real storage system;
designating a first mapped redundant array of independent regions comprising the first mapped region, wherein the first storage site is selected for inclusion in the first mapped region based on a first criterion, and wherein the first storage site is subsequently selected for inclusion in the first mapped redundant array of independent regions based on a second criterion; and
initiating an occurrence of a data operation according to the first mapped redundant array of independent regions.

20. The non-transitory storage medium of claim 19, wherein the designated first mapped redundant array of independent regions further comprises a third real region or further comprises a second mapped region, and wherein the second mapped region comprises a third storage site of a fourth real region and a fourth storage site of a fifth real region of the of a real storage system.

* * * * *